United States Patent [19]
Rinard

[11] Patent Number: 5,894,376
[45] Date of Patent: Apr. 13, 1999

[54] APPARATUS AND METHOD FOR MONITORING READ/WRITE RELIABILITY OF DATA STORAGE DEVICE

[75] Inventor: Gregory S. Rinard, Boulder, Colo.

[73] Assignee: Spectra Logic Corporation, Boulder, Colo.

[21] Appl. No.: 08/672,352

[22] Filed: Jun. 25, 1996

[51] Int. Cl.$^6$ ............................................. G11B 7/00
[52] U.S. Cl. ........................ 360/77.08; 360/53; 360/64; 360/130.23; 369/54; 369/58; 369/34; 369/32
[58] Field of Search ............................ 369/54, 58, 34, 369/32, 30; 360/53, 31, 51, 69, 64, 77.08, 130.23, 97.02

[56] References Cited

U.S. PATENT DOCUMENTS

| | | | |
|---|---|---|---|
| 4,361,855 | 11/1982 | Igarashi | 360/53 |
| 4,419,701 | 12/1983 | Harrison et al. | 360/77.08 |
| 4,694,359 | 9/1987 | Oya | 360/76 |
| 4,825,403 | 4/1989 | Gershenson et al. | 369/59 |
| 4,969,139 | 11/1990 | Azumatani et al. | 369/47 |
| 5,239,422 | 8/1993 | Sakaguchi | 360/64 |
| 5,351,156 | 9/1994 | Gregory et al. | 360/74.01 |
| 5,459,620 | 10/1995 | Tsuchiya | 360/51 |
| 5,612,827 | 3/1997 | Morita | 360/69 |
| 5,617,535 | 4/1997 | Aizawa et al. | 395/183.22 |
| 5,652,741 | 7/1997 | Takagi | 369/34 |

*Primary Examiner*—Nabil Hindi
*Attorney, Agent, or Firm*—Holme Roberts & Owen LLP

[57] ABSTRACT

The present invention provides an apparatus and method for monitoring the read/write reliability of data storage devices contained within a data cartridge library system. The data cartridge library system includes multiple player/recorder devices. In accordance with one aspect of the invention, the data cartridge library computer queries a player/recorder device after it has been involved in a read/write operation. In one embodiment, the information queried is the Write and/or Read ECC Error Rates. In another embodiment, the Write and/or Read ECC Error Rates are assessed to determine whether the subject player/recorder device is experiencing read/write problems and whether remedial action is warranted. In another embodiment, the subject player/recorder device is tested using a certified test cartridge and a known data pattern. In another aspect of the invention, preventative maintenance of the data cartridge library system includes one of the player/recorder devices writing a known data pattern to a certified test and the same device, as well as the remaining player/recorder devices, reading the known data pattern from the certified cartridge. Preferably, these steps are repeated for all player/recorders in the data cartridge library system and the respective Write and Read ECC Error Rates are displayed in a matrix format to facilitate diagnosing whether any of the player/recorders are experiencing misalignment or data interchange problems.

7 Claims, 25 Drawing Sheets

DRIVE CLEANING REQUEST

| DRIVE 1 INFO | EXIT | MAIN | HELP |
|---|---|---|---|
| SCSI ID: 2 | | W/P: | NOT LOADED |
| MANUF: HP | | | |
| MODEL: C1533A | | | |
| REV: 9503 4.59 | | | |

READ ERROR RATE: 0.78%
WRITE ERROR RATE: 0.00%
THE DRIVE HAS REPORTED THAT IT NEEDS TO BE CLEANED

[UPGRADE] [CLEAN DRIVE] [RESET]

NOTE: "DRIVE HAS REPORTED....."

READ ALERT CONDITION

| DRIVE 1 INFO | EXIT | MAIN | HELP |
|---|---|---|---|
| SCSI ID: 2 | | W/P: | NOT LOADED |
| MANUF: HP | | | |
| MODEL: C1533A | | | |
| REV: 9503 4.59 | | | |

READ ERROR RATE: 5.87%
WRITE ERROR RATE: 2.34%
THE DRIVE IS EXPERIENCING EXCESSIVE ERRORS READING DATA. TRY CLEANING DRIVE

[UPGRADE] [CLEAN DRIVE] [RESET]

NOTE: READ ERROR RATE>5%

WRITE ALERT CONDITION

| DRIVE 1 INFO | EXIT | MAIN | HELP |
|---|---|---|---|
| SCSI ID: 2 | | W/P: | NOT LOADED |
| MANUF: HP | | | |
| MODEL: C1533A | | | |
| REV: 9503 4.59 | | | |

READ ERROR RATE: 2.17%
WRITE ERROR RATE: 4.85%
EXCESSIVE ERRORS WRITING DATA. CLEAN DRIVE AND CHECK NUMBER OF LOADS FOR THIS CARTRIDGE

[UPGRADE] [CLEAN DRIVE] [RESET]

NOTE: WRITE ERROR RATE>3%

WRITE FAULT CONDITION

| DRIVE 1 INFO | EXIT | MAIN | HELP |
|---|---|---|---|
| SCSI ID: 2 | | W/P: | NOT LOADED |
| MANUF: HP | | | |
| MODEL: C1533A | | | |
| REV: 9503 4.59 | | | |

READ ERROR RATE: 2.17%
WRITE ERROR RATE: 4.85%
EXCESSIVE ERRORS WRITING DATA. CLEAN DRIVE AND CHECK NUMBER OF LOADS FOR THIS CARTRIDGE

[UPGRADE] [CLEAN DRIVE] [RESET]

NOTE: WRITE ERROR RATE>4%

TAPE LOAD COUNT ALERT

| DRIVE 2 INFO | EXIT | MAIN | HELP |
|---|---|---|---|
| SCSI ID: 3 | | W/P: OFF | LOADS: 663 |
| MANUF: HP | | | |
| MODEL: C1533A | | | |
| REV: 9406 3.84 | | | |

SENSE: x06 ASC: x86 ASCQ: x05
TAPE EXCEEDED LOAD LIMIT
THE TAPE HAS BEEN LOADED INTO DRIVES TOO MANY TIMES. REPLACE WITH A NEW TAPE

[UPGRADE] [CLEAN DRIVE] [RESET]

NOTE: LOAD COUNT AND TEXT

MISC. HARDWARE ERROR ON DRIVE

| DRIVE 1 INFO | EXIT | MAIN | HELP |
|---|---|---|---|
| SCSI ID: 1 | | W/P: OFF | LOADS: 0 |
| MANUF: HP | | | |
| MODEL: C1533A | | | |
| REV: 9406 3.39 | | | |

SENSE: x04 ASC: x40 ASCQ: x02
ERROR RETURNED BY SCSI DEVICE
CONSULT THE SCSI DEVICE'S DOCUMENTATION FOR MORE INFORMATION

[UPGRADE] [CLEAN DRIVE] [RESET]

NOTE: DRIVE REPORTED A SCSI ERROR

FIG.7B

| DATE/TIME | LIBRARY/DRIVE # | ALERT/FAULT | WRITE ECC | READ ECC | ACTION TAKEN |
|---|---|---|---|---|---|
| | | | | | |
| | | | | | |
| | | | | | |

FIG.8

TEST BEGINS

| R/W INTERCHANGE TEST | | | | |
|---|---|---|---|---|
| | RD 1 | RD 2 | RD 3 | RD 4 |
| WR 1 0.00% | 0.00% | 0.00% | 0.00% | 0.00% |
| WR 2 0.00% | 0.00% | 0.00% | 0.00% | 0.00% |
| WR 3 0.00% | 0.00% | 0.00% | 0.00% | 0.00% |
| WR 4 0.00% | 0.00% | 0.00% | 0.00% | 0.00% |
| MOVING DOOR TO DRV 1 | | | | |

FIG.14C

TEST IN PROGRESS

| R/W INTERCHANGE TEST | | | | |
|---|---|---|---|---|
| | RD 1 | RD 2 | RD 3 | RD 4 |
| WR 1 0.81% | DONE 0.89% | DONE 0.35% | DONE 1.80% | DONE 1.87% |
| WR 2 0.23% | DONE 0.79% | DONE 0.29% | DONE 0.99% | DONE 1.24% |
| WR 3 1.08% | 0.00% | 0.00% | 0.00% | 0.00% |
| WR 4 0.00% | 0.00% | 0.00% | 0.00% | 0.00% |
| MOVING TO DRIVE 1 | | | | |

FIG.14D

TEST FINISHED

| R/W INTERCHANGE TEST | | | | |
|---|---|---|---|---|
| | RD 1 | RD 2 | RD 3 | RD 4 |
| WR 1<br>0.81% | DONE<br>0.89% | DONE<br>0.35% | DONE<br>1.80% | DONE<br>1.87% |
| WR 2<br>0.23% | DONE<br>0.79% | DONE<br>0.29% | DONE<br>0.99% | DONE<br>1.24% |
| WR 3<br>1.08% | DONE<br>0.78% | DONE<br>0.30% | DONE<br>0.79% | DONE<br>1.83% |
| WR 4<br>0.48% | DONE<br>1.86% | DONE<br>0.33% | DONE<br>0.63% | DONE<br>0.53% |
| TEST COMPLETE | | | | |

FIG.14E

| R/W INTERCHANGE TEST | | | | |
|---|---|---|---|---|
| LD 0 | RD 1 | RD 2 | RD 3 | RD 4 |
| WR 1<br>0.10% | DONE<br>0.09% | DONE<br>0.25% | DONE<br>0.56% | DONE<br>0.06% |
| WR 2<br>0.12% | DONE<br>0.10% | DONE<br>0.19% | DONE<br>0.28% | DONE<br>0.04% |
| WR 3<br>0.11% | DONE<br>0.11% | DONE<br>0.11% | DONE<br>0.11% | DONE<br>0.06% |
| WR 4<br>0.09% | DONE<br>0.17% | DONE<br>2.01% | DONE<br>1.66% | DONE<br>0.17% |
| TEST COMPLETE | | | | |

FIG.15

| R/W INTERCHANGE TEST | | | | |
|---|---|---|---|---|
| LD 40 | RD 1 | RD 2 | RD 3 | RD 4 |
| WR 1 3.84% | DONE 5.39% | DONE 31403 | DONE 2.05% | DONE 7.07% |
| WR 2 0.78% | DONE 0.57% | DONE 0.80% | DONE 0.21% | DONE 0.94% |
| WR 3 0.33% | DONE 1.12% | DONE 0.86% | DONE 0.43% | DONE 2.13% |
| WR 4 0.98% | DONE 0.44% | DONE 0.77% | DONE 0.15% | DONE 0.82% |
| TEST COMPLETE | | | | |

FIG.16

| R/W INTERCHANGE TEST | | | | |
|---|---|---|---|---|
| LD 638 | RD 1 | RD 2 | RD 3 | RD 4 |
| WR 1 0.43% | DONE 0.56% | DONE 0.52% | DONE 3.15% | DONE 0.62% |
| WR 2 0.60% | DONE 0.46% | DONE 0.60% | DONE 2.10% | DONE 0.64% |
| WR 3 0.33% | DONE 0.91% | DONE 4.40% | DONE 0.38% | DONE 1.44% |
| WR 4 0.36% | DONE 0.46% | DONE 0.38% | DONE 7.26% | DONE 0.40% |
| COMPLETED W/ WARNINGS | | | | |

FIG. 17

TEST FINISHED

R/W INTERCHANGE TEST

| | RD 1 | RD 2 | RD 3 | RD 4 |
|---|---|---|---|---|
| WR 1 | DONE 0.89% | DONE 4.25% | DONE 4.32% | DONE 4.17% |
| 0.81% | | | | |
| WR 2 | DONE 4.81% | DONE 0.29% | DONE 0.99% | DONE 1.24% |
| 0.23% | | | | |
| WR 3 | DONE 4.88% | DONE 0.30% | DONE 0.79% | DONE 1.83% |
| 1.08% | | | | |
| WR 4 | DONE 4.73% | DONE 0.33% | DONE 0.63% | DONE 0.53% |
| 0.48% | | | | |

TEST COMPLETE

FIG.18

TEST FINISHED

| R/W INTERCHANGE TEST | | | | |
|---|---|---|---|---|
| | RD 1 | RD 2 | RD 3 | RD 4 |
| WR 1 0.81% | DONE 0.89% | DONE 4.81% | DONE 1.80% | DONE 1.87% |
| WR 2 0.23% | DONE 4.25% | DONE 0.29% | DONE 4.32% | DONE 4.17% |
| WR 3 1.08% | DONE 0.78% | DONE 4.88% | DONE 0.79% | DONE 1.83% |
| WR 4 0.48% | DONE 1.86% | DONE 4.73% | DONE 0.63% | DONE 0.53% |

TEST COMPLETE

FIG.19

TEST FINISHED

| R/W INTERCHANGE TEST | | | | |
|---|---|---|---|---|
| | RD 1 | RD 2 | RD 3 | RD 4 |
| WR 1 0.81% | DONE 0.89% | DONE 0.35% | DONE 4.81% | DONE 1.87% |
| WR 2 0.23% | DONE 0.79% | DONE 0.29% | DONE 4.88% | DONE 1.24% |
| WR 3 1.08% | DONE 4.25% | DONE 4.32% | DONE 0.79% | DONE 4.17% |
| WR 4 0.48% | DONE 1.86% | DONE 0.33% | DONE 4.73% | DONE 0.53% |
| TEST COMPLETE | | | | |

FIG.20

TEST FINISHED

| R/W INTERCHANGE TEST | | | | |
|---|---|---|---|---|
| | RD 1 | RD 2 | RD 3 | RD 4 |
| WR 1<br>0.81% | DONE<br>0.89% | DONE<br>0.35% | DONE<br>1.80% | DONE<br>4.81% |
| WR 2<br>0.23% | DONE<br>0.79% | DONE<br>0.29% | DONE<br>0.99% | DONE<br>4.88% |
| WR 3<br>1.08% | DONE<br>0.78% | DONE<br>0.30% | DONE<br>0.79% | DONE<br>4.73% |
| WR 4<br>0.48% | DONE<br>4.25% | DONE<br>4.32% | DONE<br>4.17% | DONE<br>0.53% |

TEST COMPLETE

FIG.21

APPARATUS AND METHOD FOR MONITORING READ/WRITE RELIABILITY OF DATA STORAGE DEVICE

FIELD OF THE INVENTION

This invention relates generally to data cartridge libraries, and more particularly to the read/write reliability of player/recorders used by such data cartridge libraries.

BACKGROUND

The general purpose of data cartridge library systems is to store large amounts of data provided by a host computer system and to transfer stored data back to the host computer system when needed.

The components of a typical data cartridge library system include a storage array for holding a number of data cartridges that each contain a recording media, typically tape or disk; one or more player/recorder for writing data from the host computer onto the recording media and reading data previously recorded on the recording media and providing this data to the host computer system; and a picker for moving data cartridges between the storage array and the player/recorders. One commonly used player/recorder is known as a helical scan tape player, which records narrow strips of data diagonally across a tape. Another type of player/recorder is known as a digital linear tape drive.

The typical data cartridge library system also includes an operator interface that permits an operator to interact with the system. Generally, the interface is comprised of an output device, such as a CRT, and an input device, such as a keyboard.

Further included in the typical data cartridge library system is a controller that processes requests from the host computer system and operator inputs. For example, the controller would respond to a request from the host computer to write data onto recording media in a data cartridge by causing the picker to retrieve the subject cartridge from the storage array and load the cartridge into the appropriate player/recorder so that data from the host computer can be recorded.

One problem with present data cartridge library systems is that occasionally such systems are either unable to store/retrieve data on a recording media in a data cartridge or the storing/retrieval requires a substantial amount of time and/or effort. Presently, one source if the read/write problem has been identified as the use of "old cartridges." More specifically, when magnetic media within a data cartridge has been subjected to a number of read/write operations in a recorder/player, the magnetic media becomes worn out, thereby making storage/retrieval of the data difficult. To address this problem, many library systems periodically replace "old cartridges" with "new cartridges" that contain the data previously recorded on the old cartridge.

Even with the periodic replacement of data cartridges, the noted read/write problem persists. Consequently, there is a need for an apparatus and method which further provides the ability to reliably read/write data.

SUMMARY OF THE INVENTION

The present invention is directed to a data cartridge library system that improves the ability to store/retrieve data to/from the system over the noted systems. In this regard, the present invention recognizes that player/recorders, in addition to recording media, can prevent or inhibit the ability to store/retrieve data to/from recording media in a data cartridge.

To elaborate, the present invention recognizes that in library systems employing two or more player/recorders, a misalignment in a player/recorder that writes data on a recording media can prevent or substantially inhibit another player/recorder from reading data from the cartridge. Conversely, a misalignment in a player/recorder that reads data from the recording media on which data was recorded by a properly aligned player/recorder can also prevent or inhibit reading data from the media. The effect of a misaligned player/recorder in a library system that employs two or more player/recorders is especially evident in library systems that employ helical scan tape players in which the data strips must be written within a specified range of angles relative to the longitudinal axis of the tape.

In one embodiment of the invention, a data cartridge library system with multiple helical scan tape players includes a device for recovering information from the players that is useful for identifying a misaligned tape player. In one embodiment, the information used is the error correction code (ECC) error rate during read/write operations. The ECC error rate is the ratio of the amount of data with respect to which a read/write operation must be retried to the amount of data which a read/write operation was attempted. Preferably, this information is displayed on an operator interface or at the host computer system in a matrix type fashion that permits patterns to be discerned that are characteristic of the misalignment or "data interchange" problem so that appropriate remedial action can be taken with respect to the misaligned player.

It was also recognized that other player/recorder problems inhibit the writing/reading of data to/from a recording media. Specifically, in the case of tape players, the present invention recognizes that various films can adhere to a transducer which is used to read a tape, thereby inhibiting the writing/reading of data to/from the tape. Consequently, another embodiment of the invention employs the previously noted elements of a data cartridge library system and a mechanism for receiving information from a player/recorder and using the information to initiate a remedial procedure on which one and possibly more attempts are made to remove the film from the transducer. In one embodiment, the information used is the ECC error rate. Further, the information used to indicate these problems is displayed on the operator interface and/or the host computer system.

In a further embodiment of the invention, a method is provided which uses information from a player/recorder to take remedial action that is most likely to resolve any problems indicated by the information. In one embodiment, the information is used to assess whether the player/recorder or the recording medium is the most likely source of the problem and, based on the assessment, take the appropriate remedial action. If the player/recorder is most likely to be at fault, the remedial action includes cleaning the transducer once and perhaps several times. If the recording media is the most likely source of the problem, the media is replaced with new media

BRIEF DESCRIPTION OF THE DRAWINGS

FIGS. 7A–7B show display screens on the output device of the library user interface for an Alert warning and Fault condition and possible error messages resulting from the Alert warning or Fault condition.

FIG. 8 show a log used to record Alert warnings and Fault conditions.

FIGS. 14A–14E show the display screens on the output device of the library interface during a read/write confidence test.

FIG. 15 shows the display screen on the output device of the library user interface after completion of a read/write confidence test, the display indicating that none of the player/recorder devices are exhibiting any read/write problems.

FIG. 16 shows the display screen on the output device of the library user interface after completion of a read/write confidence test, the display indicating player/recorder device problem with player/recorder device #1.

FIG. 17 shows the display screen on the output device of the library user interface after completion of a read/write confidence test, the display indicating a misalignment problem with player/recorder device #3.

FIG. 18 shows the display screen on the output device of the library user interface after completion of a read/write confidence test, the display indicating that player/recorder #1 is exhibiting misalignment or data interchange problems.

FIG. 19 shows the display screen on the output device of the library user interface after completion of a read/write confidence test, the display indicating that player/recorder #2 is exhibiting misalignment or data interchange problems.

FIG. 20 shows the display screen on the output device of the library user interface after completion of a read/write confidence test, the display indicating that player/recorder #3 is exhibiting misalignment or data interchange problems.

FIG. 21 shows the display screen on the output device of the library user interface after completion of a read/write confidence test, the display indicating that player/recorder #4 is exhibiting misalignment or data interchange problems.

DETAIL DESCRIPTION OF THE INVENTION

Figure 1:
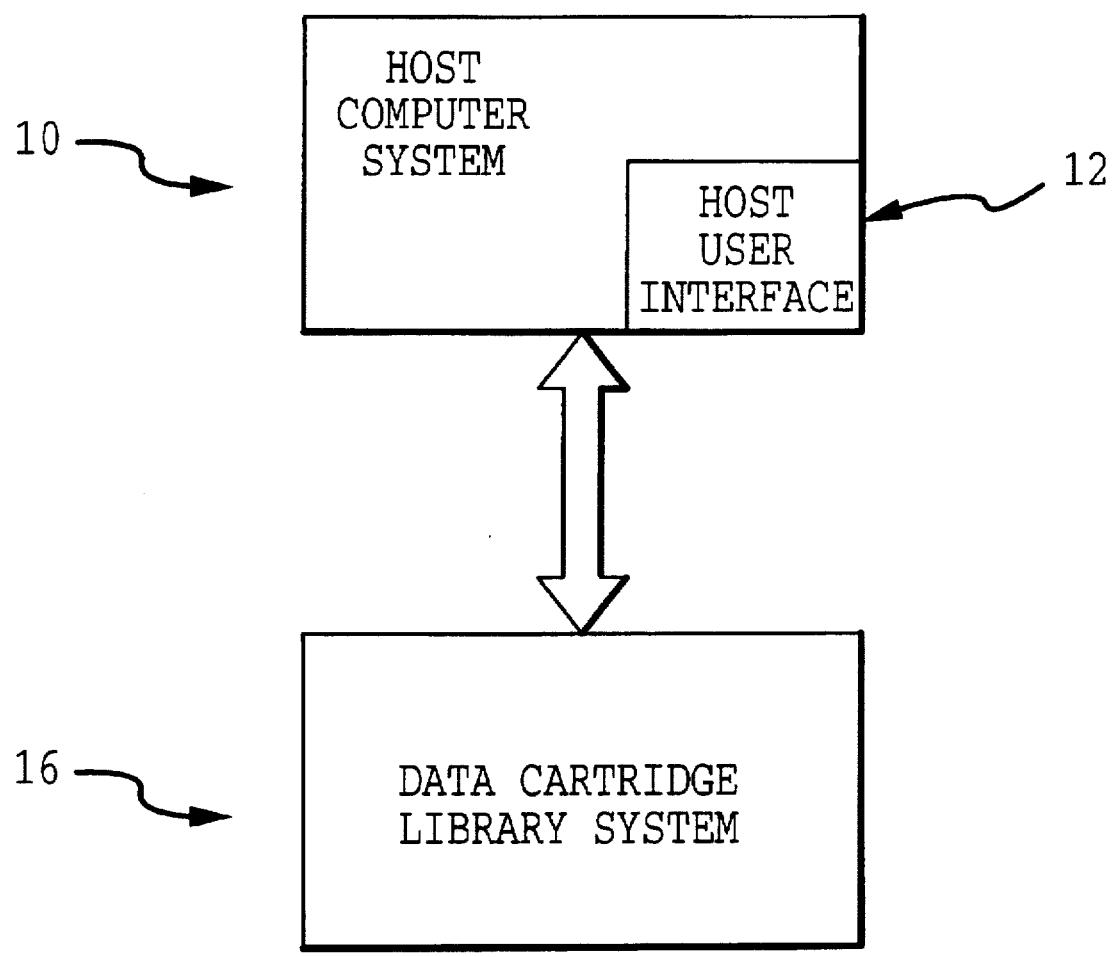
FIG. 1 is a block diagram showing the interconnection of the host computer system with the data cartridge library system.

With reference to FIG. 1, a host computer system 10 is shown interfaced with a data cartridge library system 16.

The host computer system 10 communicates with the data cartridge library system 16 through the use of application software. The host computer system 10 includes a host user interface 12 to allow, for example, the host computer administrator to monitor and control the host computer system 10.

Figure 2:
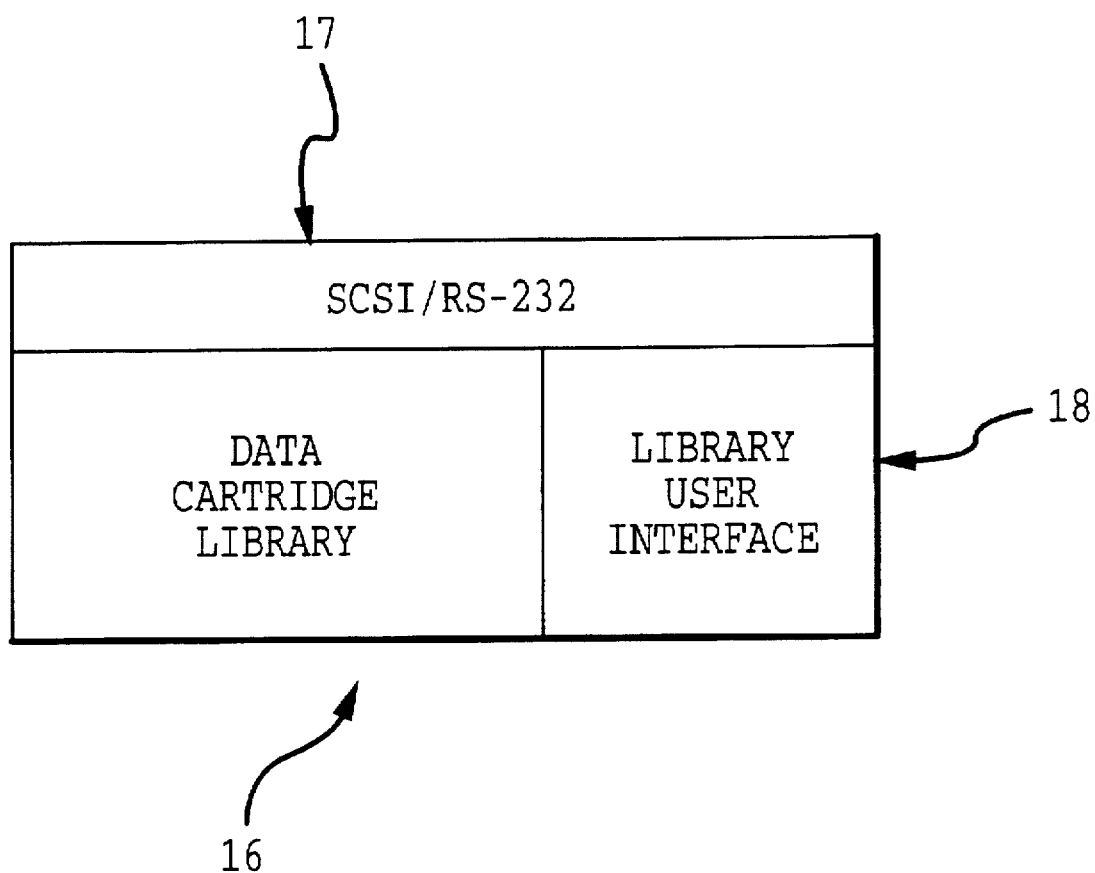
FIG. 2 is a block diagram showing the components of a data cartridge library system.

As shown in FIG. 2, the data cartridge library system 16 is interfaced with the host computer system 10 through a small computer system interface (SCSI) or an RS-232 serial port interface 17. The data cartridge library system 16 includes a library user interface 18 to allow, for example, the data cartridge library system administrator to monitor and control the data cartridge library system 16 at the situs of the system 16. In this regard, the library user interface 18 includes an output device, such as a CRT, and an input device, such as a keyboard.

Figure 3:
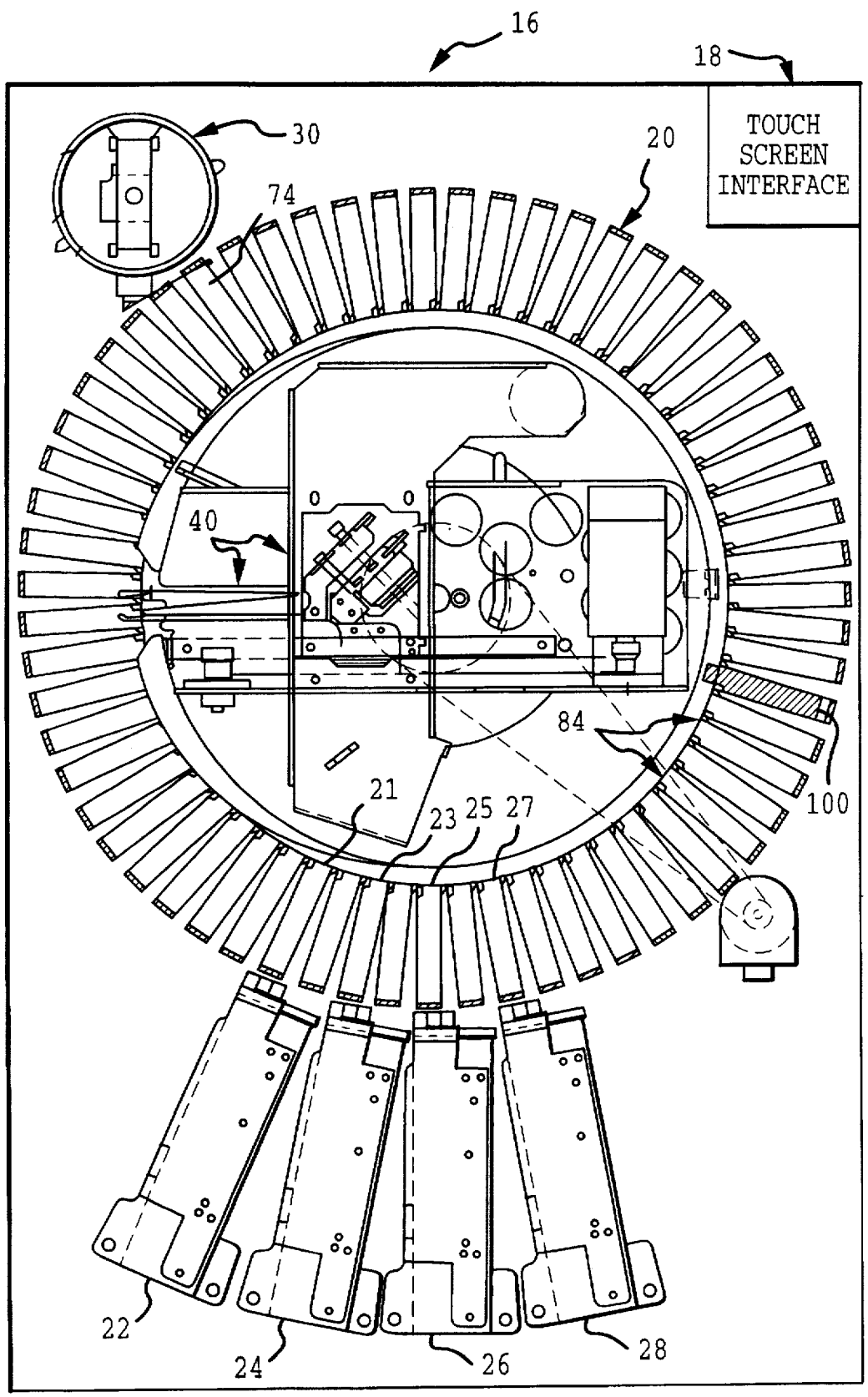
FIG. 3 is a plan view of a data cartridge library system.

Referencing FIG. 3, a plan view of a data cartridge library system 16 is shown. The data cartridge library system includes a rotating entry/exit device 30, a storage array 20, a transport device 40 and multiple player/recorder devices 22, 24, 26, 28 and a library user interface 18, which is preferably a touch screen interface. The rotating entry/exit device 30 permits data cartridges 100 to be inserted into and removed from the data cartridge library system 16. The storage array 20 includes multiple storage slots 84, for accommodating data cartridges 100. The transport device 40 and player/recorder devices 22, 24, 26, 28 are positioned on opposite sides of the storage array 20. The transport device 40 moves data cartridges 100 between the rotating entry/exit device 30, the storage array 20 and the player/recorder devices 22, 24, 26, 28. In this regard, the storage array 20 includes pass through slots 74, 21, 23, 25, 27 which are located in front of the entry/exit device 30 and the player/recorder devices 22, 24, 26, 28, respectively, to allow the transport device 40 to move a data cartridge 100 through the pass through slots 74, 21, 23, 25, 27 and to/from the entry/exit device 30 and player/recorder devices 22, 24, 26, 28.

Figure 4:
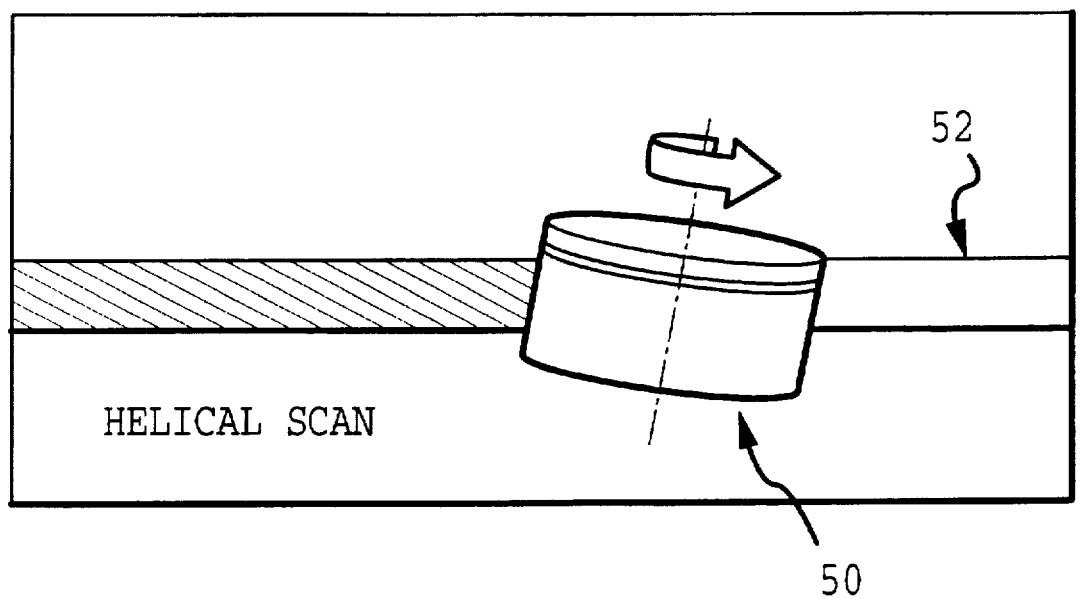
FIG. 4 is a graphic illustration of how a helical scan tape player records data on a tape.

The player/recorder devices 22, 24, 26, 28 are capable of writing data onto recording media in a data cartridge 100 and reading data recorded on the recording media. The player/recorder devices 22, 24, 26, 28 are selected from devices which are known in the art, including, for example, helical scan tape drives that can read/write data on industry standard 4 mm or 8 mm tape cassettes. As illustrated in FIG. 4, helical scan tape drives employ read/write heads mounted on a rotating drum 50 to record narrow strips of data diagonally across the tape 52.

Figure 5:
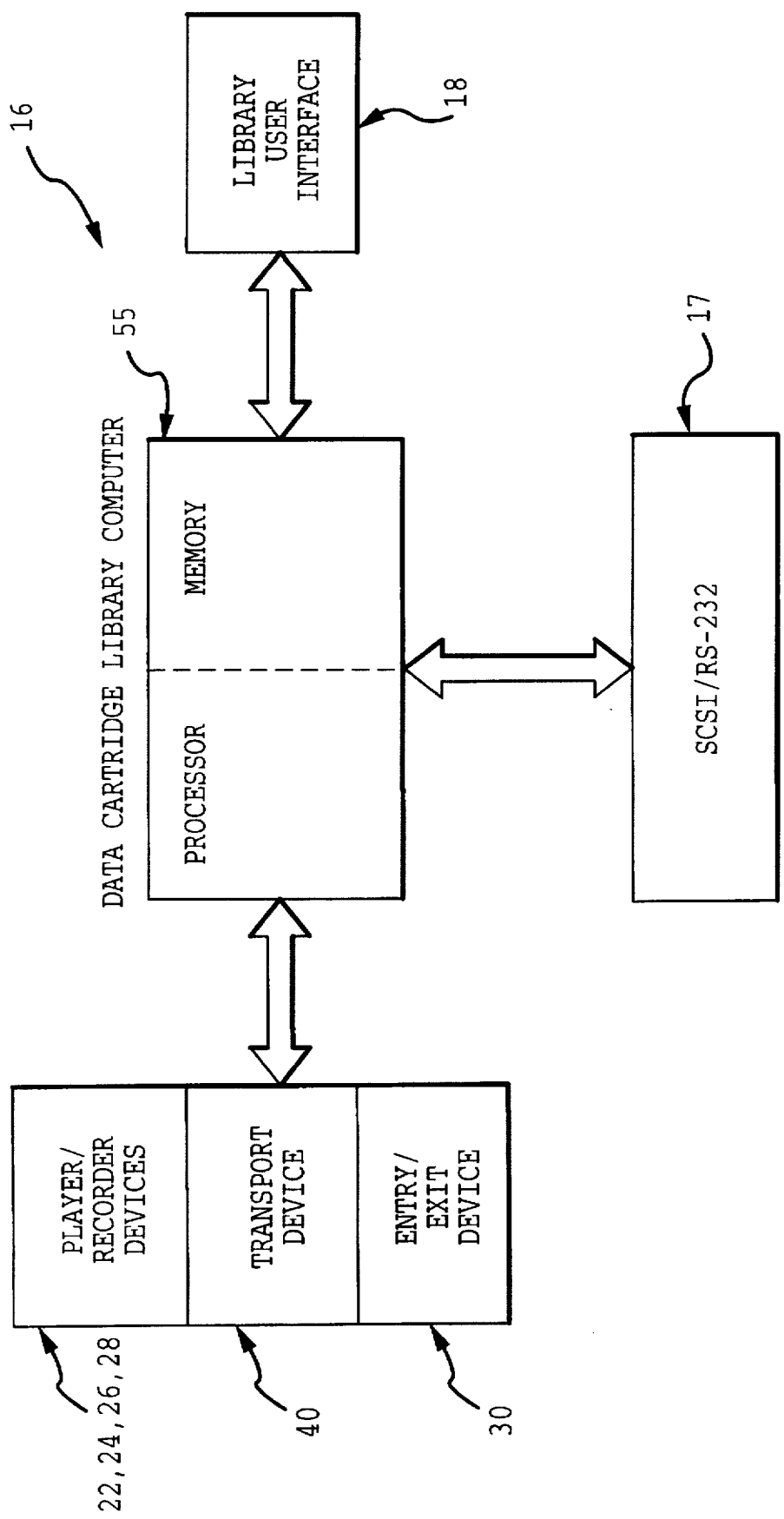
FIG. 5 is a block diagram showing the components of a data cartridge library system, including a data cartridge library computer.

Referencing FIG. 5, the data cartridge library system 16 includes a computer 55 capable of controlling the rotating entry/exit device 30, the transport device 40 and the player/recorders 22, 24, 26, 28. The computer 55 receives commands from the host computer system 10 and/or library user interface 18, carries out the accepted commands and transmits information to the host computer 10 and/or library user interface 18. Additionally, the data cartridge library system 16 can be programmed to automatically execute commands. In this regard, programming of the data cartridge library computer 55 can occur, for example, by inserting into the data cartridge library system 16 a data cartridge having software routines thereon and copying such routines to the computer 55.

Having described the components of the system 16, the operation thereof will now be described. Generally, the data cartridge library system 16 stores data provided by the host computer 10 and transfers stored data back to the host computer system 10. For example, if the host computer 10 desires to write/read data to/from tape #1 located in slot #1, the host computer 10 first commands the data cartridge library system 16 to "load" tape #1 into one of the player/recorder devices 22, 24, 26, 28. When received and accepted, the data cartridge library computer 55 causes the transport device 40 to move to slot #1, grasp tape #1 and pull tape #1 away from slot #1. The computer 55 then causes the transport device 40 to move tape #1 to the pass through slot positioned in front of the subject player/recorder device, move tape #1 through the pass through slot and into the subject player/recorder device. The computer 55 further checks the subject player/recorder device to verify that the subject player/recorder device is ready for the write/read operation. At this point, the computer 55 acknowledges to the host computer system 10 that the load command was successfully completed. When acknowledgement is received, the host computer system 10 writes/reads data to/from tape #1 in the subject player/recorder device.

The host computer system 10 next commands the data cartridge library system 16 to unload tape #1 from the subject player/recorder device. When received and accepted, the data cartridge library computer 55 causes the subject player/recorder device to eject tape #1. The computer 55 then causes the transport device 40 to grasp tape #1, remove tape #1 from the subject player/recorder device and move tape #1 through the pass through slot. The computer 55 then causes the transport device 40 to move tape #1 to slot #1 and push tape #1 into slot #1. At this point, the computer 55 acknowledges to the host computer system 10 that the unload command was successfully completed.

Player/recorder devices 22, 24, 26, 28, such as helical scan tape players, have built-in read-after-write/read verification which allows the player/recorder device to rewrite/reread any data which does not verify with the original source of the data. For example, during the write/read operation described above, the subject player/recorder device rereads the data the subject player/recorder device has just written/read to/from tape #1 by use of an Error Detection Correction Algorithm (ECC) which tracks the number of date blocks which are written/read and the number of data blocks which had to be rewritten/reread (defined as the Write/Read ECC Error Rate). Alternatively, the player/recorder devices 22, 24, 26, 28 have built-in read-while-write verification.

In accordance with one aspect of the invention, after a read/write operation, the subject player/recorder device is queried for information to determine if any read or write problems were experienced. In one embodiment, the data cartridge library computer 55 queries the subject player/recorder device for the Write and/or Read ECC Error Rates. In this regard, the data cartridge library computer 55 can be programmed to automatically query a player/recorder device for the Write and/or Read ECC Error Rates immediately after a write or read operation occurs involving the player/recorder device. Alternatively, the host computer 10 can issue commands to the data cartridge library system 16 to query the subject player/recorder device for the Write and/or Read ECC Error Rates. Additionally, a player/recorder device may have a built-in mechanism for requesting a cleaning of the player/recorder's read/write heads (referred to as "player/recorder device cleaning request").

Figure 6:
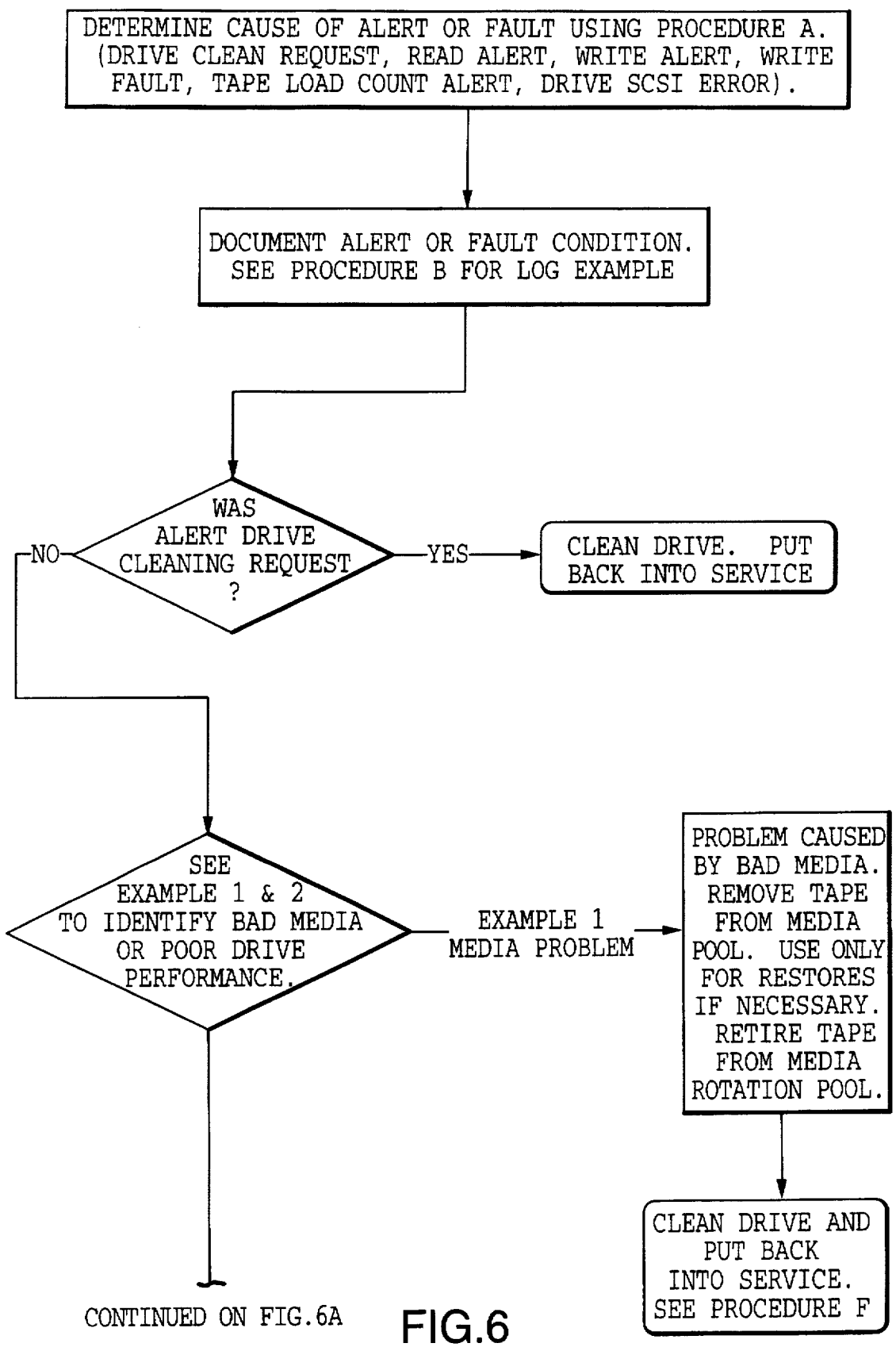
FIG. 6 is a flow chart showing the process for determining the cause of an Alert warning or Fault condition.
Figure 6A:
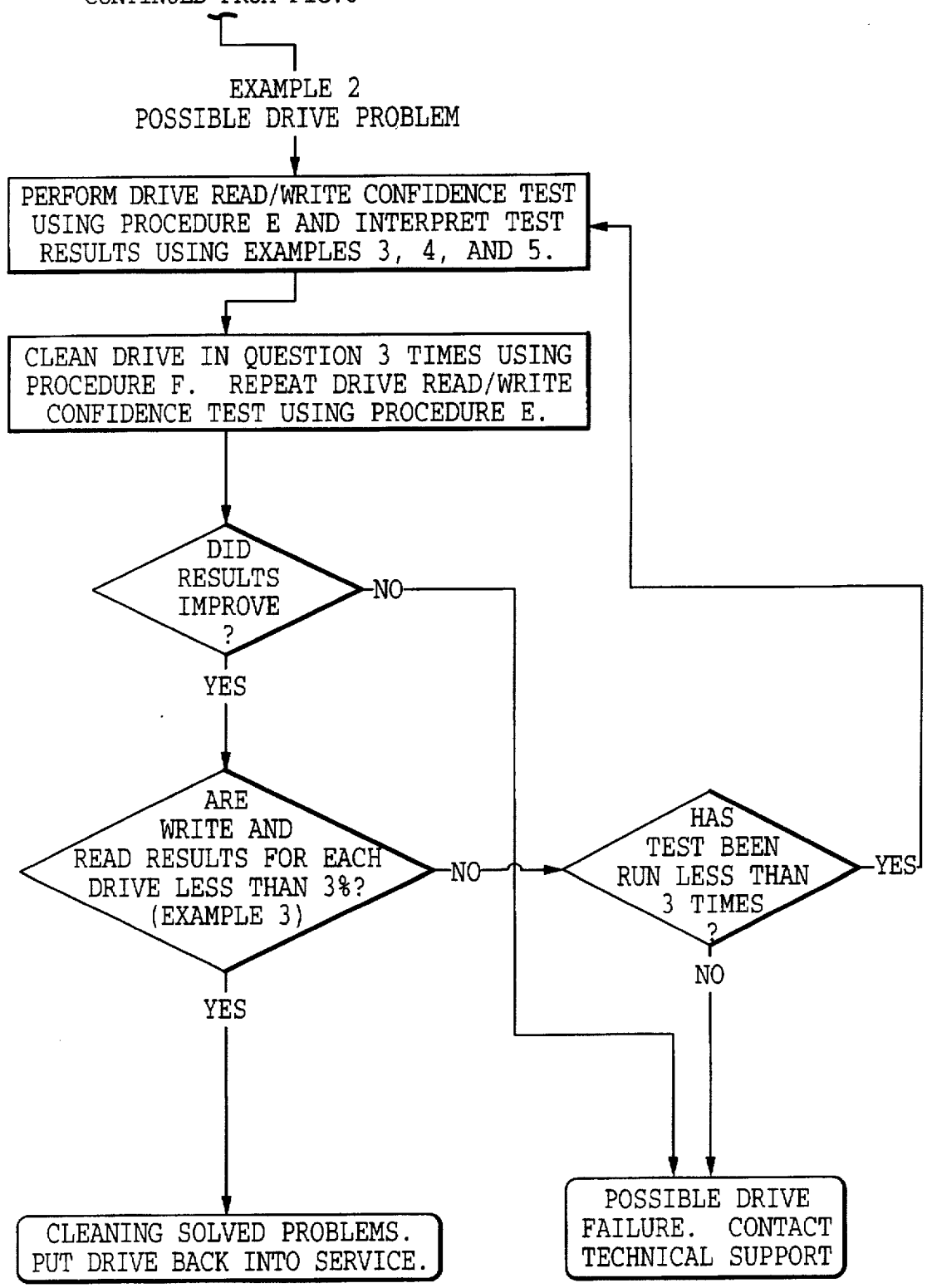
Figure 7A:
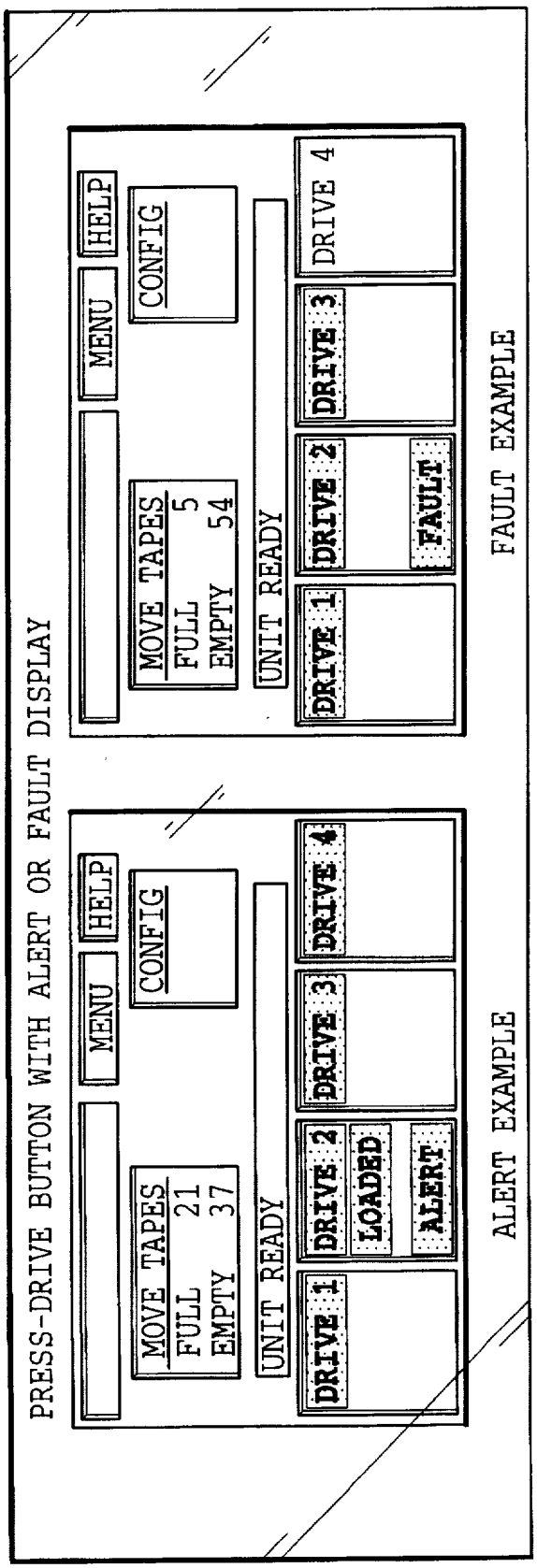
Figure 9A:
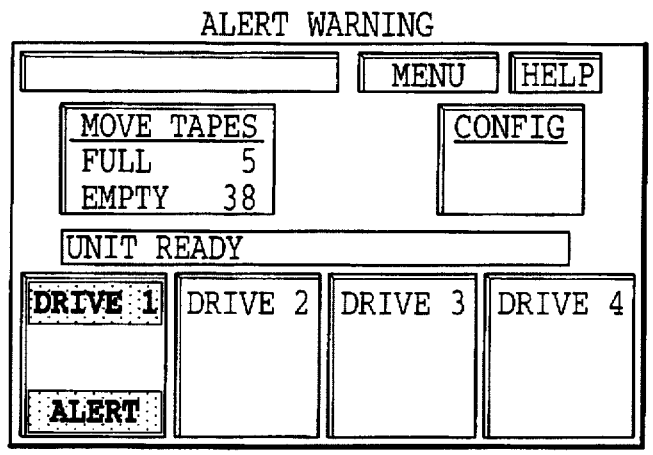
FIGS. 9A–9C show the display screens on the output device of the library user interface when an Alert warning is issued.
Figure 9B:
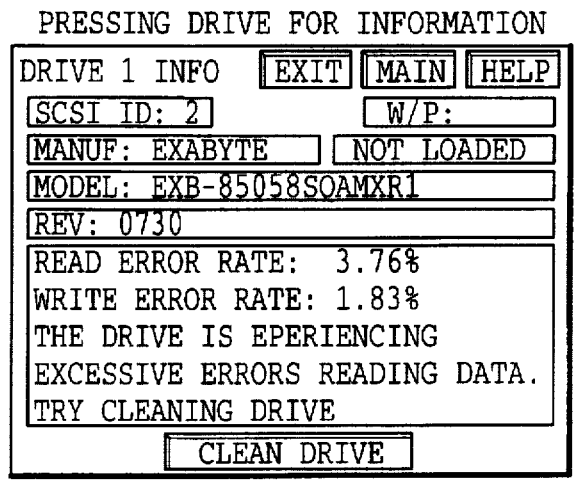
Figure 9C:
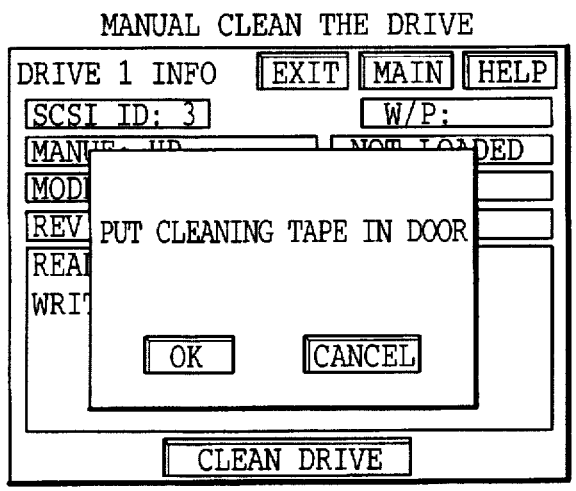
Figure 10A:
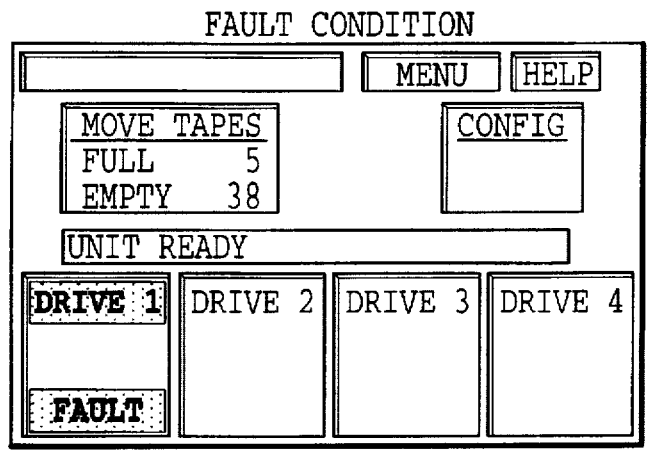
FIGS. 10A–10C show the display screens on the output device of the data library interface when a Fault condition issues.
Figure 10B:
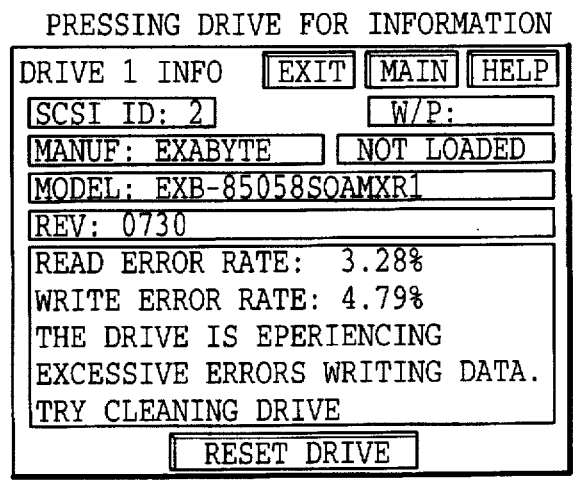
Figure 10C:
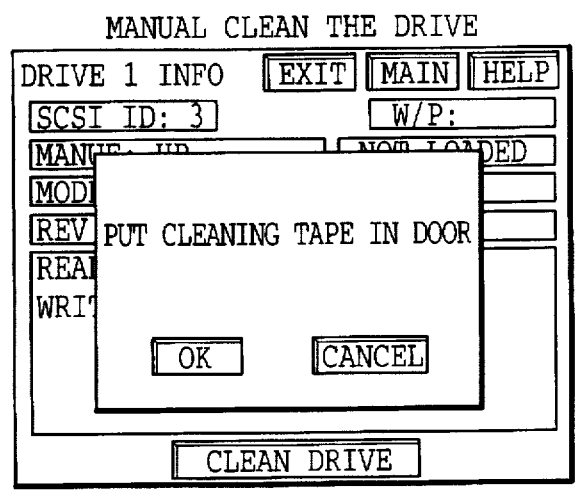

Referencing FIG. 6, preferably, the Write and/or Read ECC Error Rates are used to determine whether an Alert warning or Fault condition should issue. An Alert warning is intended to issue when a potential read/write reliability problem is detected and preventative action is warranted. A Fault condition is intended to issue when a read/write reliability problem has occurred end corrective action is necessary. Referencing FIGS. 7A–7B (showing "Procedure A"), preferably, Alert warnings and/or Fault conditions are processed in conjunction with other information, such as for example, player/recorder device cleaning requests, load counts and player/recorder device errors, to determine read/write problems experienced by the subject player/recorder device. With further reference to FIG. 8 (showing "Procedure B"), Alert warnings and Fault conditions are logged for future reference. In this regard, tracking a player/recorder device's Alert/Fault history is useful for diagnosing read/write problems.

the issuance of a Alert warning or Fault condition is based on write and read error rate percentages. For example, as shown in FIG. 9A, if the Write and Read ECC Error Rates for a player/recorder are both under 4% but one of the Error Rates exceeds 2%, an Alert warning is communicated visually to the output device of the library user interface 18. As shown in FIG. 10A, if either the Write or Read ECC Error Rates exceeds 4%, a Fault condition is communicated visually to the output device of library user interface 18. Alternatively, a Fault Condition only issues when the Write ECC Error Rate exceeds 4%. Alternatively, an Alert warning only issues when the Write ECC Error Rate exceeds 2% and does not exceed 4% and the Read ECC Error Rate exceeds 3%. It is important to note that the ECC Error Rate thresholds for issuing an Alert warning or a Fault condition will vary according to, among other things, the player/recorder devices used. In this regard, the library administrator can be given the option to select the ECC Error Rate thresholds. An Alert warning or Fault condition can also be communicated to the host computer system 10 and/or audibly via the library user interface 18.

In another aspect of the invention, the Write and/or Read ECC Error Rates are used to diagnose whether the read/write heads within a player/recorder have become dirty and whether remedial action is warranted in response to the issuance of an Alert warning or Fault condition. Preferably, the data cartridge library computer 55 is programmed to automatically initiate remedial actions to address the read/write reliability problem identified by the issuance of an Alert warning or Fault condition. Alternatively, the host computer system 10 can issue commands for remedial actions and/or the data cartridge library administrator can initiate remedial action via the library user interface 18.

In one embodiment, the read/write heads of the subject player/recorder device are cleaned (referred to as "Procedure F") in response to an Alert warning or Fault condition or a player/recorder device cleaning request. For example, referencing FIGS. 9A–9C and 10A–10C, a cleaning cartridge, inserted into the data cartridge library system 16 via the entry/exit device 30 or store in the storage array 20 of the data cartridge library system 16, is loaded into the subject player/recorder device. Next, the read/write heads of the selected player/recorder device are cleaned using a single pass cleaning in the case of an Alert warning or a triple pass cleaning in the case of a Fault condition. It is recognized that cleaning the read/write heads multiple times sometimes provides better results than a single pass cleaning. Upon completion of the single pass or triple pass cleaning, the cleaning cartridge is unloaded.

Figure 11:
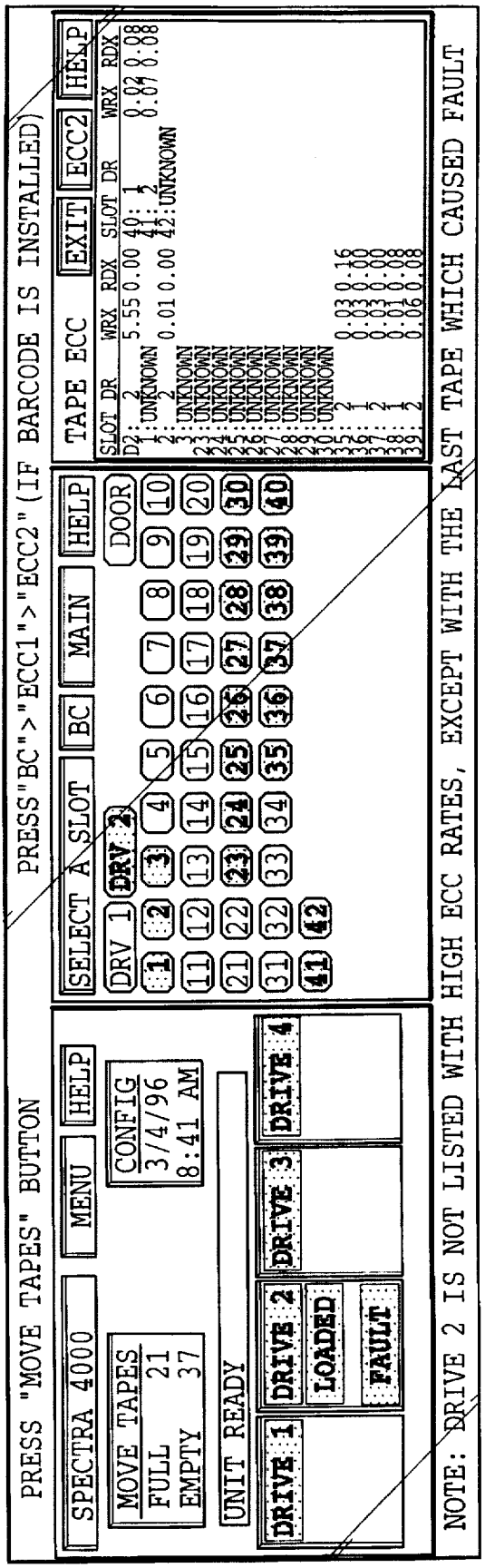
FIG. 11 show display screens on the output device of the data library interface showing ECC mapping which indicates a media problem.

In another embodiment, the Write and/or Read ECC Error Rates are used to diagnose whether the data cartridge is suspect. In this regard, the Write and/or Read ECC Error Rates are mapped for each data cartridge contained within a slot of the data cartridge library. Referencing FIG. 11 (defined as "Example 1"), a visual display is shown indicating the latest Write and Read ECC Error Rates for each data cartridge in each slot and the drive the Write and Read ECC Error Rates were obtained from. The reference to "Unknown" indicates that the data cartridge has not been subject to a read or write operation since the data cartridge library was powered up. The visual display shown in FIG. 11 indicates that a suspect data cartridge caused an Fault warning. In this regard, the Write and/or Read ECC Error Rates for data cartridges last loaded in to player/recorder device #2 are normal, except for the last data cartridge loaded. FIG. 11 also shows a visual display indicating which slots contain data cartridges.

Figure 12:
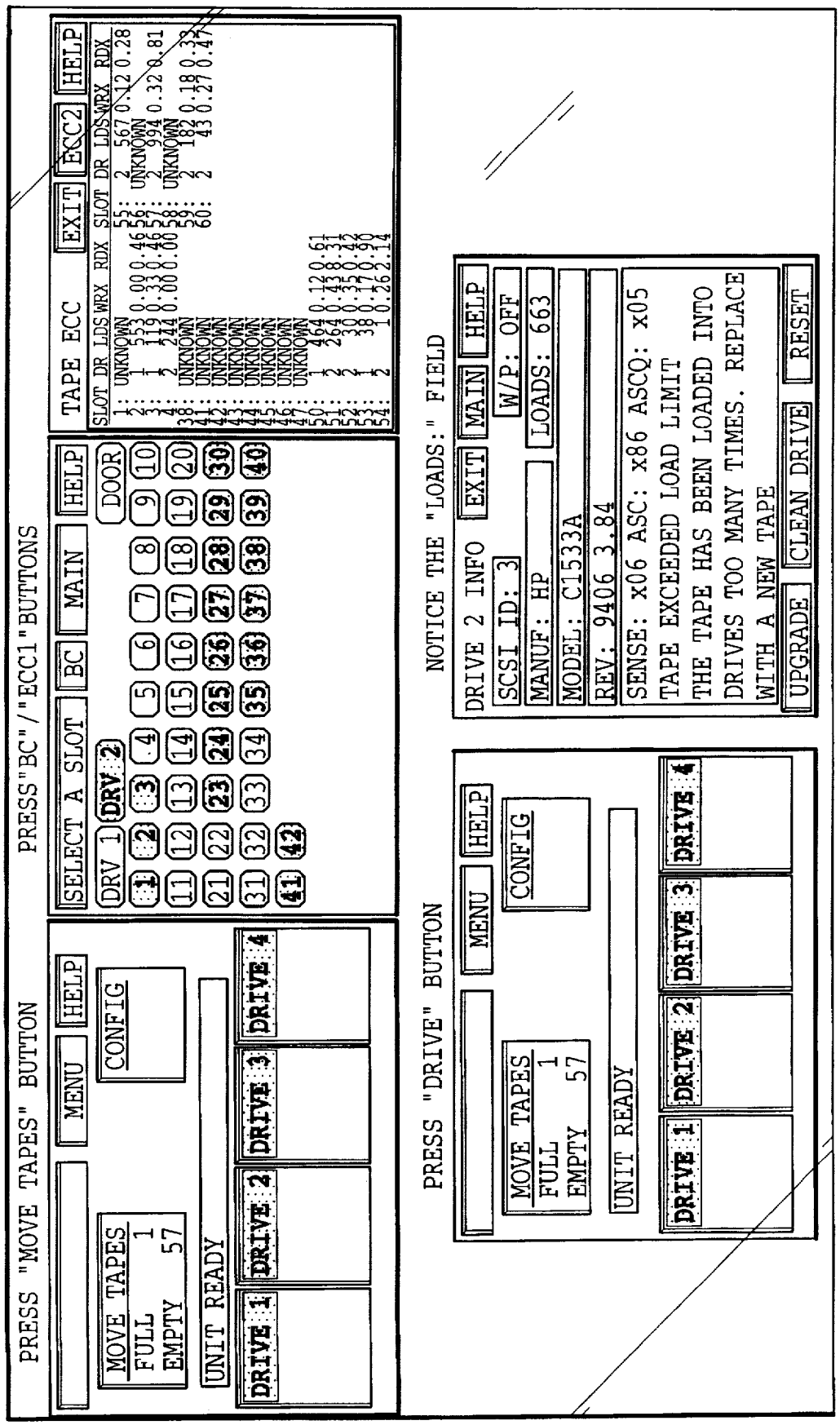
FIG. 12 show display screens on the output device of the data library interface showing ECC mapping which indicates, among other things, the number of loads a particular data cartridge has been subject to and a tape load count alert.

In another embodiment, the number of times a particular data cartridge has been loaded into a player/recorder device is processed in response to an Alert warning or Fault condition. In this regard, it is recognized that the issuance of an Alert warning or Fault condition may have resulted from a media problem, caused by, for example, high usage of a data cartridge. For example, known player/recorder devices employ storage registers which can be queried to determine how many times a data cartridge, last loaded into the player/recorder device, has been loaded. If it is determined that a data cartridge has been loaded a predetermined number of times, the data cartridge library administrator is notified to replace the data cartridge. For example, before or after the causing a single or triple pass cleaning, the subject player/recorder device is queried to determine how many times tape #1 has been loaded into a player/recorder device. If it is determined that tape #1 has been loaded a predetermined amount of times (e.g., 250 times), the data cartridge library administrator is notified that tape #1 needs to be replaced via the output device of the library user interface. Referencing FIG. 12, preferably, a tape load count alert issues when a tape load exceeds a predetermined amount. Preferably, the number of times a particular data cartridge has been loaded, and, if appropriate, data cartridge replacement, occur in conjunction with monitoring the "Write and/or Read ECC Error Rates, and if appropriate, cleaning of the player/recorder device.

Figure 13:
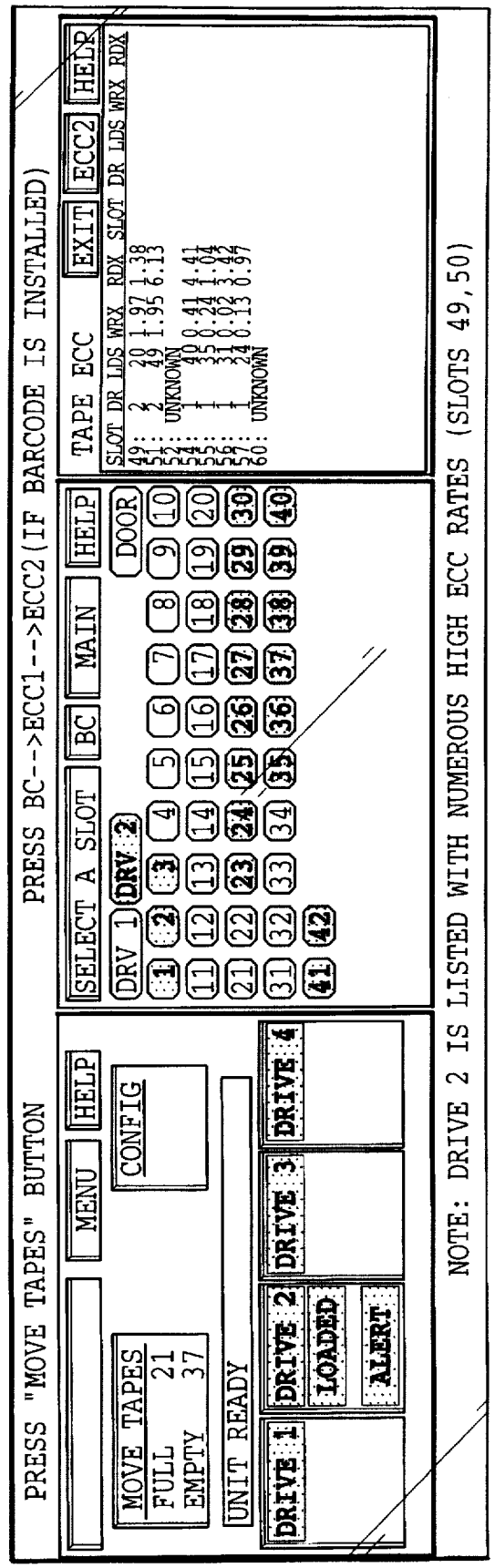
FIG. 13 show display screens on the output device of the data library interface showing ECC mapping which indicates a problem with the player/recorder device.

In another embodiment, the Write and/or Read ECC Error Rates are used to diagnose whether a player/recorder is suspect. In this regard, the Write and/or Read ECC Error Rates are mapped for each data cartridge contained within a slot of the data cartridge library. Referencing FIG. 13 (defined as "Example 2"), a visual display is shown indicating the latest Write and Read ECC Error Rates for each data cartridge in each slot and the drive the Write and Read ECC Error Rates were measured on. The reference to "Unknown" indicates that either a data cartridge is not positioned in the slot or the data cartridge has not been subject to a read or write operation since the data cartridge library was powered up. The visual display shown in FIG. 13 indicates that a suspect player/recorder caused an Alert warning. In this regard, the Write and/or Read ECC Error Rates for data cartridges last loaded in to player/recorder device #2 are abnormal.

In another embodiment, in response to a Fault condition, the subject player/recorder device is rendered unavailable for use (i.e. taken "off-line") until the subject player/recorder is "recertified". Preferably, the subject player/recorder is recertified by a certification test using a certified data cartridge and a known data pattern. A certified data cartridge has known good recording media, thus eliminating the possibility that the Fault condition is due to a media problem. Preferably, the certification test is executed for the next available time the data cartridge library computer 55 is available to receive a command, thereby minimizing the time the subject player/recorder is off-line. Notably, the data cartridge library system 16 continues to function using the remaining player/recorder devices.

When the computer 55 becomes available, a certified data cartridge, stored in the storage array 20 of the data cartridge library system 16 or inserted into the data cartridge library system 16 via the entry/exit device 30, is loaded into the subject player/recorder device. The test includes commanding the subject player/recorder to write a predetermined data pattern to the certified data cartridge, ejecting the certified data cartridge, reloading the certified data cartridge into the subject player/recorder, and commanding the subject player/recorder device to read the predetermined data pattern previously written onto the certified data cartridge. Upon completion of the read command, the certified data cartridge is unloaded and the Write and Read ECC Error Rates are queried and processed.

If either of the Write or Read ECC Error Rates exceeds 4%, the subject player/recorder device is placed on permanent "off-line" status and the host computer system and/or data cartridge administrator is notified of this status. Alternatively, a second triple pass cleaning of the subject player/recorder device can be done and the subject player/recorder device "scheduled" for another certification test. If the Write or Read ECC Error Rates of the subject player/recorder are less than 4% and either rate exceeds 2%, a single pass cleaning of the subject player/recorder is performed and the subject player/recorder device is placed back 37 on-line." If both the Write and Read ECC Error Rates of the subject player/recorder are less than 2%, the subject player/recorder device is placed back "on-line" without further remedial action.

A player/recorder device taken permanently off-line will require user intervention to correct the read/write reliability problems. For example, the data cartridge library can be taken off-line and the subject player/recorder device replaced with another by the data cartridge library device administrator. Preferably, preventative maintenance of the data cartridge library system is regularly undertaken to identify a player/recorder device experiencing read/write reliability problems. Preferably, a diagnostic test is periodically performed of all the player/recorder devices to identify read/write reliability problems. In this regard, preventative maintenance is intended to minimize the number of times a subject player/recorder is taken "off-line " during operation of the data cartridge library system 16.

Figure 14A:
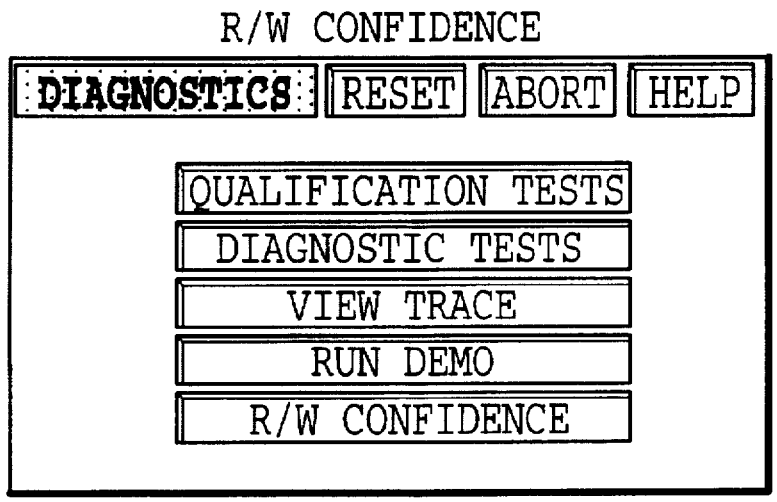
Figure 14B:
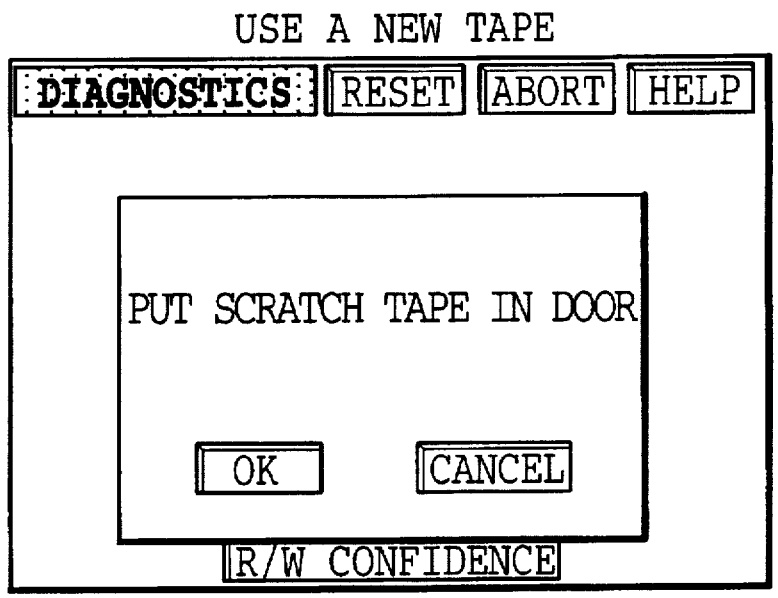

In accordance with another aspect of the invention, the data cartridge library is capable of conducting a diagnostic test known as a "read/write confidence test " on all of the player/recorder devices (defined as "Procedure E"). The display screens as displayed on the library user interface 18, for initiating the read/write confidence test are shown in FIGS. 14A–14B. In one embodiment, wherein the data cartridge library system 16 includes four player/recorder devices, a certified data cartridge is loaded into player/recorder device #1 and a known data pattern is written to the certified data cartridge. After completing the write command, the certified data cartridge is ejected from player/recorder #1 and reloaded into player/recorder #1 and the known data pattern is read from the certified tape. After completing the read command, the certified data cartridge is ejected from player/recorder #1, loaded into player/recorder #2 and the known data pattern is read from the certified tape. After completing the read command, the certified data cartridge is ejected from player/recorder #2, loaded into player/recorder #3 and the known data pattern is read from the certified tape. Finally, after completing the read command, the certified data cartridge is ejected from player/recorder #3, loaded into player/recorder #4 and the known data pattern is read from the certified tape. This sequence of steps is repeated for player/recorder #2, player/recorder #3 and player/recorder #4.

Referencing FIGS. 14C–14E, as the test progresses, the Write and Read ECC Error Rates for each player/recorder is queried and shown visually to the data cartridge library administrator via the output device of the library user interface 18. Preferably, the Write and/or Read ECC Error Rates are visually shown in matrix form. An example of a matrix display is shown in FIG. 15 (defined as "Example 3") which indicates normal ECC Error Rates for all player/recorder devices. Preferably, the respective Write and Read ECC Error Rates are processed and Alert warnings and Fault conditions are issued in appropriate circumstances. More preferably, remedial action is undertaken in response to the issuance of each Alert warning or Fault condition.

In another embodiment, a matrix display is used to identify player/recorder device problems. Referencing FIG. 16 (defined as "Example 4"), a visual display is shown indicating that player/recorder device #1 has an excessive Write ECC Error Rate followed by a high Read ECC Error Rate. Additionally, the other player/recorder devices are having difficulty reading the data written by player/recorder device #1. In this read, player/recorder #2 was unable to read the data written by player/recorder device #1 as indicated by the reference to "31403", which is an error message.

In another embodiment, the matrix display is used to identify one or more misaligned player/recorder devices. In this regard, it is recognized that in data cartridge library systems employing two or more player/recorder devices, a misalignment in a player/recorder device that writes data on a data cartridge will prevent or substantially inhibit another player/recorder device from reading the same data from the data cartridge. Referencing FIG. 17 (defined as "Example 5"), a misalignment in a player/recorder device #3 is shown. In this regard, the Road ECC Error Rates are high for player/recorder device #3 for data recorded by a properly aligned player/recorder devices #1, #2 and #4. This problem is generally known as a "data interchange problem."

Referencing FIG. 18, the display matrix for player/recorder #1 experiencing a data interchange problem is shown. In this regard, the Write ECC Error Rate 90 and Read ECC Error Rate 92 for player/recorder #1 are acceptable (e.g., under 2%). However, the Read ECC Error Rates 94, 96, 98 for player/recorder #2, player/recorder #3, and player/recorder #4, respectively, for data written by player/recorder #1 are not acceptable (e.g., exceed 4%). Additionally, the Read ECC Error Rates 95, 97, 99 for player/recorder #1 for data written by player/recorder #2, player/recorder #3, and player/recorder #4, respectively, are not acceptable (e.g., exceed 4%).

Displaying the respective Write and Read ECC Error Rates in matrix form assists the data cartridge library administrator identifying a misaligned player/recorder device. Once identified, appropriate remedial action, such as replacing the misaligned player/recorder device, is undertaken. FIGS. 19, 20, and 21 show matrix displays indicating that player/recorder #2, player/recorder #3 and player/recorder #4, respectively, are exhibiting data interchange problems.

The foregoing description of the invention has been presented for purposes of illustration and description. Further, the description is rams intended to limit the variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A helical scan tape cartridge library apparatus comprising:
   storage array means for storing a plurality of tape cartridges that each contain a tape for storing data and which has a longitudinal axis;
   a first helical scan tape player that is capable of writing a track of data on a tape located within a tape cartridge;
   a second helical scan tape player that is capable of reading a track of data on a tape located within a tape cartridge;
   picker means for moving a tape cartridge between said storage array means and said first and second helical scan tape players;
   wherein said first helical scan tape player is designed to write a crack of data on a tape within a predetermined range of angles away from the longitudinal axis of the tape;
   wherein said second helical scan tape player is designed to read a track of data on a tape within said predetermined range of angles away from the longitudinal axis of the tape;
   wherein said first helical scan tape player may have a first misalignment that would cause said first helical scan tape player to write a track of data on a tape at an angle outside said predetermined range of angles and if said second helical scan tape player reads the tape within said predetermined range of angles effectively prevents the track of data from being read;
   wherein said second helical scan tape player may have a second misalignment that would cause said second helical scan tape player to read a track of data on a tape at an angle outside said predetermined range of angles and if said first helical scan tape player wrote the track within said predetermined range of angles, effectively prevent the track of data from being read;
   means for receiving information from said first and second helical scan tape players; and means for using said information to potentially identify at least one of said first misalignment and said second misalignment problems.

2. A helical scan tape cartridge library apparatus as claimed in claim 1, wherein:
   said means for receiving information includes a computer.

3. A helical scan tape cartridge library apparatus as claimed in claim 1, wherein:
   said information includes the Write and Read ECC Error Rates for said first and second helical scan tape players.

4. A helical scan tape cartridge library apparatus as claimed in claim 3, wherein:
   said means for using said information includes means for visually displaying said Write and Read ECC Error Rates for said first and second helical scan tape players.

5. A helical scan tape cartridge library apparatus as claimed in claim 1, further comprising:
   means for visually displaying information from said first and second helical scan tape players in a manner which permits a user to potentially identify a misalignment problem with one of said first and second helical scan tape players.

6. A method for detecting read/write problems for use by data cartridge library, said method comprising the steps of:

providing storage array means for storing a plurality of data cartridges;

providing a plurality of player/recorder means, each for reading/writing data on a data cartridge;

providing picker means for moving data cartridges between said storage array means and said plurality of player/recorder means;

providing a diagnostic data cartridge;

loading said diagnostic data cartridge into one of said plurality of player/recorder means; and using said diagnostic data cartridge to identify a read/write problem with at least one of said plurality of player/recorder means wherein said plurality of player/recorder means are capable of providing on Write and Read ECC Error Rates after a Write or Read operation has been completed;

said step of using said diagnostic data cartridge includes:
said player/recorder means in which said diagnostic data cartridge is loaded writing a data pattern to said diagnostic data cartridge;

said player/recorder means reading the data pattern from the diagnostic data cartridge;

loading said diagnostic data cartridge into the remaining of said plurality of player/recorder means and having said remaining of said plurality of player/recorder means reading said data pattern written on said diagnostic data cartridge; and visually displaying the respective Write and Read ECC Error Rates for said plurality of player/recorder means.

7. A method for detecting read/write problems for use by data cartridge library, as claimed in claim 6, wherein:

said step of using said diagnostic data cartridge is repeated for each of said plurality of player/recorder means.

* * * * *